US012466190B2

(12) United States Patent
Araki et al.

(10) Patent No.: US 12,466,190 B2
(45) Date of Patent: Nov. 11, 2025

(54) INKJET PRINTING APPARATUS AND INK TANK

(71) Applicant: CANON KABUSHIKI KAISHA, Tokyo (JP)

(72) Inventors: Yuta Araki, Ichikawa (JP); Kosuke Umehara, Kawasaki (JP); Koki Shimada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/511,827

(22) Filed: Nov. 16, 2023

(65) Prior Publication Data

US 2024/0083174 A1 Mar. 14, 2024

Related U.S. Application Data

(63) Continuation of application No. 18/045,678, filed on Oct. 11, 2022, now Pat. No. 11,833,829, which is a continuation of application No. 16/834,388, filed on Mar. 30, 2020, now Pat. No. 11,491,796.

(30) Foreign Application Priority Data

Apr. 3, 2019 (JP) ................................. 2019-071351

(51) Int. Cl.
*B41J 2/175* (2006.01)
*B41J 2/21* (2006.01)

(52) U.S. Cl.
CPC ......... *B41J 2/17509* (2013.01); *B41J 2/1754* (2013.01); *B41J 2/21* (2013.01)

(58) Field of Classification Search
None
See application file for complete search history.

(56) References Cited

U.S. PATENT DOCUMENTS

2019/0299624 A1* 10/2019 Mizutani .............. B41J 2/17553
2020/0238713 A1* 7/2020 Ishizawa .............. B41J 2/17523

* cited by examiner

*Primary Examiner* — Justin Seo
(74) *Attorney, Agent, or Firm* — Canon U.S.A., Inc. IP Division

(57) ABSTRACT

An inkjet printing apparatus includes an ink tank that contains an ink to be supplied to a printing head that ejects the ink, the ink being injected from an ink bottle. The inkjet printing apparatus further includes an injection assistance member including a first passage and a second passage. The first passage is defined by a first upper end portion opening toward the outside of the ink tank and a first lower end portion opening toward the inside of the ink tank. The second passage is defined by a second upper end portion opening toward the outside of the ink tank and projecting upward less than the first upper end portion and a second lower end portion opening toward the inside of the ink tank and larger than the first lower end portion in terms of a distance from the bottom surface of the ink tank.

12 Claims, 12 Drawing Sheets

INKJET PRINTING APPARATUS AND INK TANK

CROSS-REFERENCE TO RELATED APPLICATIONS

The present application is a continuation of U.S. patent application Ser. No. 18/045,678, filed on Oct. 11, 2022, which is a continuation of U.S. patent application Ser. No. 16/834,388, filed on Mar. 30, 2020, which claims priority from Japanese Patent Application No. 2019-071351 filed Apr. 3, 2019, which are hereby incorporated by reference herein in their entireties.

BACKGROUND OF THE INVENTION

Field of the Invention

The present invention relates to an inkjet printing apparatus that prints an image by ejecting an ink and relates to an ink tank.

Description of the Related Art

Japanese Patent Laid-Open No. 2018-161887 discloses a configuration in which an ink can be supplied while gas-liquid exchange is performed between an ink supply container and an ink tank with a plurality of passages inserted into the tank through openings of the ink tank serving as an ink passage and an air passage. A user is thereby enabled to supply an ink to the ink tank without compressing the ink supply container.

In the configuration disclosed in Japanese Patent Laid-Open No. 2018-161887, however, there is a possibility of usability being decreased because ink injection may take time when the area of the aperture of the passage through which the ink flows is small.

The present invention has been developed in consideration of the aforementioned circumstance and provides an inkjet printing apparatus in which a time required for injecting an ink to an ink tank is reduced.

SUMMARY OF THE INVENTION

To address the aforementioned circumstance, an inkjet printing apparatus according to the present invention includes an ink tank configured to contain an ink to be supplied to a printing head that ejects the ink, the ink being injected from an ink bottle. The inkjet printing apparatus further includes an injection assistance member including a first passage defined by a first upper end portion and a first lower end portion, the first upper end portion opening toward the outside of the ink tank, the first lower end portion opening toward the inside of the ink tank, and a second passage defined by a second upper end portion and a second lower end portion, the second upper end portion opening toward the outside of the ink tank and projecting upward less than the first upper end portion, the second lower end portion opening toward the inside of the ink tank and being larger than the first lower end portion in terms of a distance from the bottom surface of the ink tank.

Further features of the present invention will become apparent from the following description of exemplary embodiments with reference to the attached drawings.

DESCRIPTION OF THE EMBODIMENTS

First Embodiment

Hereinafter, an embodiment of the present invention will be described with reference to the drawings. The following embodiment, however, does not intend to limit the present invention, and all of combinations of features described in the embodiment are not necessarily essential for solutions of the present invention. In addition, the relative position, the shape, and the like of each component described in the embodiment are merely presented as examples and do not intend to limit the scope of the present invention to them only.

Apparatus Configuration

Figure 1A:
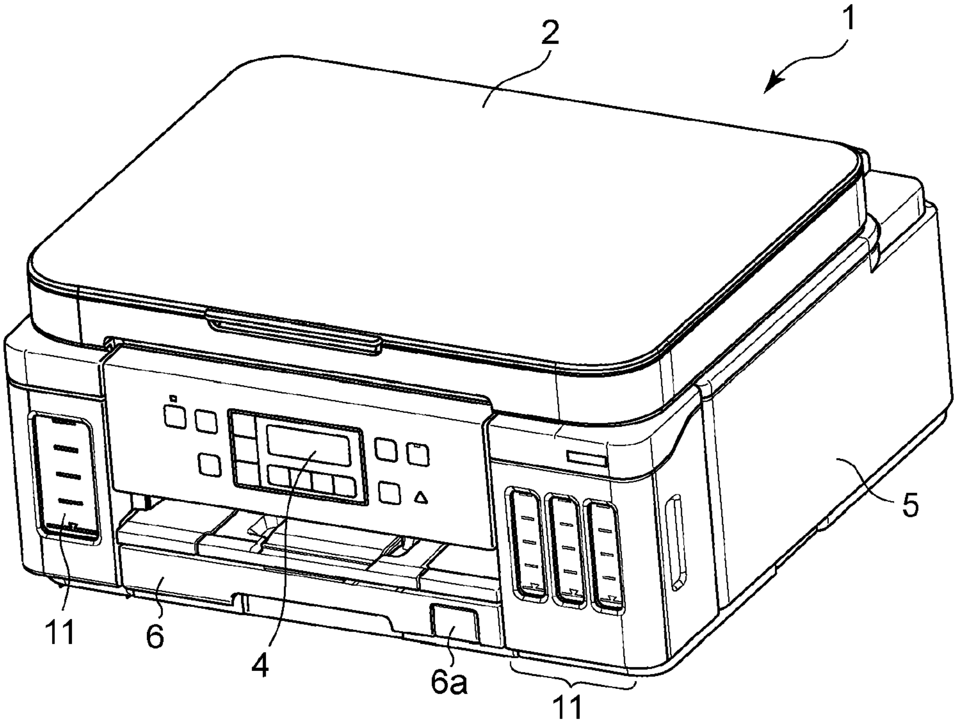
FIGS. 1A and 1B are external perspective views of an inkjet printing apparatus according to a first embodiment.

FIG. 1A is an external perspective view of an inkjet printing apparatus (hereinafter referred to as the printing apparatus) 1 in the present embodiment. The printing apparatus 1 includes a housing 5, a printing head 3 (refer to FIG. 2) that performs printing operation with respect to a print medium, and an ink tank 11 as an ink containing container configured to contain an ink to be supplied to the printing head 3. In the present embodiment, the ink tank 11 is disposed at the front of the housing 5 and fixed to the body of the apparatus. At the front of the housing 5, an operation unit 4 that enables a user to perform operation, such as command input, for the printing apparatus 1 is also provided. The operation unit 4 of the present embodiment also includes a display panel capable of displaying, for example, an error of the printing apparatus 1.

At the front of the housing 5, a paper feeding cassette 6 insertable and extractable by a user with respect to the housing 5 is disposed. The paper feeding cassette 6 includes a window portion 6*a* to enable a user to visually recognize a print medium loaded inside the paper feeding cassette 6. The window portion 6*a* can be constituted by a transparent member of, for example, glass or plastic.

Figure 1B:
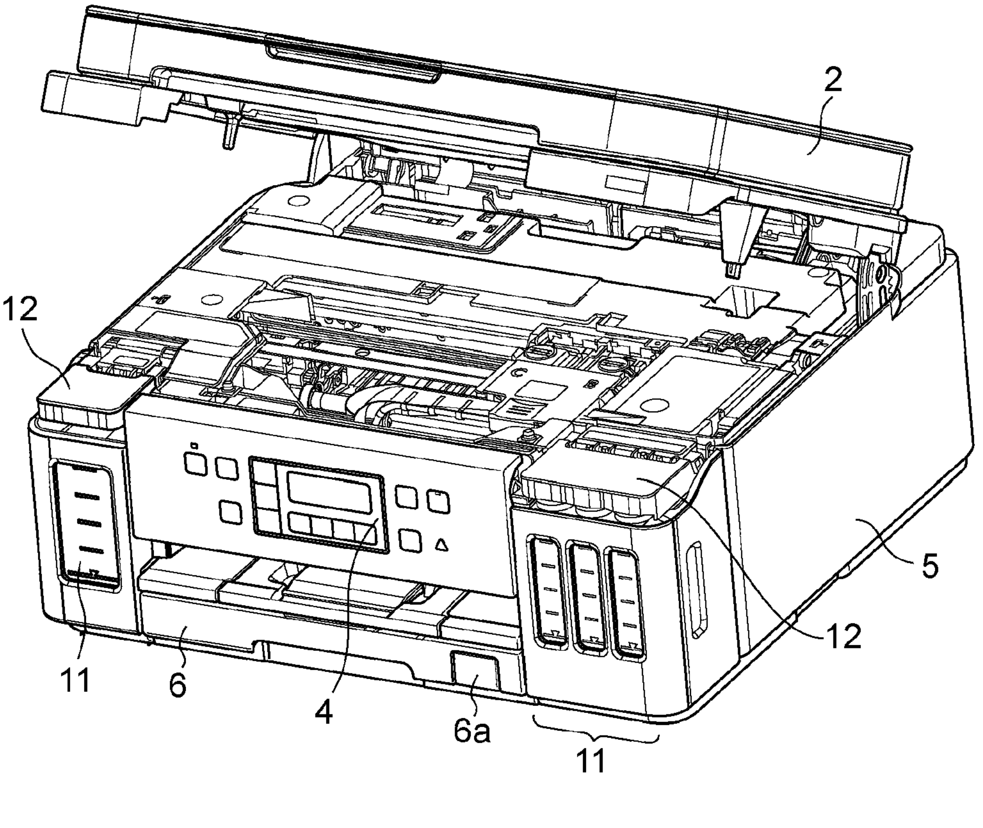

At the upper portion of the housing 5, a scanner unit 2 that performs operation of reading documents is disposed to be openable with respect to the housing 5. FIG. 1B is an external perspective view of the printing apparatus 1 with the scanner unit 2 opened with respect to the housing 5. When the scanner unit 2 is opened, a tank cover 12 capable of covering the upper surface of the ink tank 11 is exposed. In FIG. 1B, the tank cover 12 is closed. The detail of the tank cover 12 will be described later. Alternatively, a configuration in which a body cover on which the scanner unit 2 is not loaded is openable with respect to the housing 5 may be employed.

Figure 2:
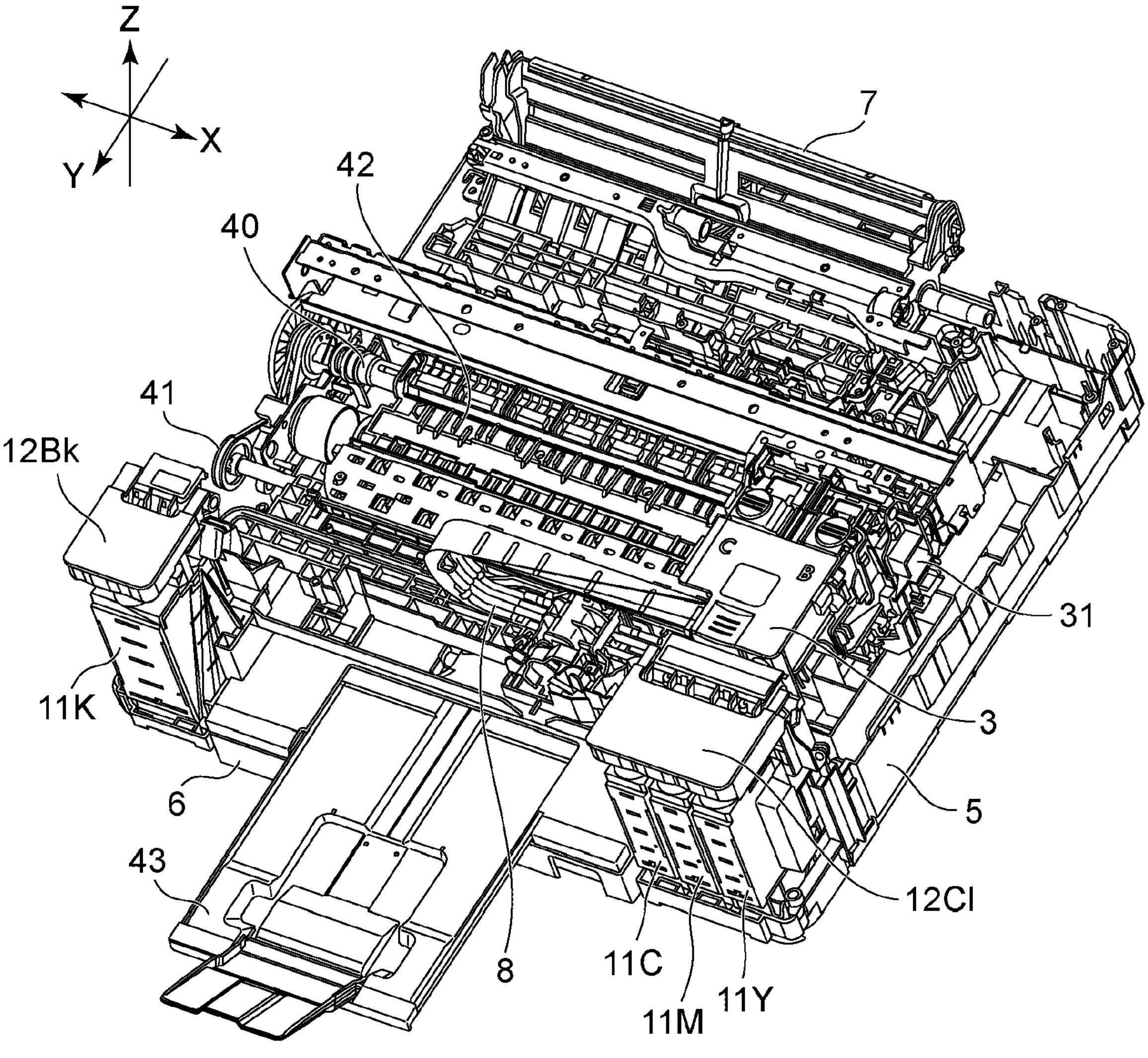
FIG. 2 is a perspective view illustrating an internal configuration of the inkjet printing apparatus according to the first embodiment.

FIG. 2 is a perspective view illustrating an internal configuration of the printing apparatus 1. The printing apparatus 1 feeds a print medium loaded on the paper feeding cassette 6 at the front of the housing 5 or a paper feed tray 7 at the back thereof by a feeder (not illustrated). The print medium fed by the feeder is conveyed onto a platen 42 at a position opposite the printing head 3 by a conveyance roller (conveying means) 40. The platen 42 is a member for guiding and supporting a print medium onto which printing is performed by the printing head 3. The print medium for which printing by the printing head 3 has been completed is discharged onto a discharge tray (discharge portion) 43 by a discharge roller (discharging unit) 41. The discharge tray 43 is disposed above the paper feeding cassette 6.

A direction (Y direction illustrated in FIG. 2) in which a print medium is conveyed by the conveyance roller 40 is referred to as the conveyance direction. In other words, the upstream side in the conveyance direction corresponds to the back side of the housing 5, and the downstream side in the conveyance direction corresponds to the front side of the housing 5.

The printing head 3 is loaded on a carriage 31 that reciprocates in a main scanning direction (X direction illustrated in FIG. 2) intersecting the conveyance direction. In the present embodiment, the conveyance direction and the main scanning direction are orthogonal to each other.

The printing head 3 prints (printing operation) an image of an amount of one band with respect to a print medium by ejecting ink droplets while moving together with the carriage 31 in the main scanning direction. When the image of the amount of one band is printed, the print medium is conveyed (intermittent conveyance operation) by a predetermined amount in the conveyance direction by the conveyance roller 40. As a result of the printing operation of the amount of one band and the intermittent conveyance operation being repeated, the image is printed on the entirety of the print medium on the basis of image data.

The printing apparatus 1 includes a maintenance unit disposed within a scanning region of the carriage 31 and outside a printing region in which printing operation is performed by the printing head 3. The maintenance unit is a unit that performs maintenance processing for maintaining the ejection performance of the printing head 3. The maintenance unit is disposed at a position to face an ejection-port surface on which ejection ports for ink are arranged. The printing head 3 illustrated in FIG. 2 is positioned at a position (home position) that enables maintenance processing of the maintenance unit. The maintenance unit includes, for example, a cap capable of capping the ejection-port surface and a suction-based recovery mechanism that performs suction operation for removing residual bubbles and a thickened ink in the ejection ports by suctioning the ink forcibly while capping is performed.

In the present embodiment, an example of a serial head in which the printing head 3 is loaded on the carriage 31 is presented; however, the present invention is not limited thereto and is applicable to a line head in which a plurality of ejection ports are arranged in a region of a width corresponding to the width of a print medium.

The ink tank 11 is disposed in the printing apparatus 1 for each color of inks to be ejected by the printing head 3. In the present embodiment, four ink tanks including an ink tank 11K for black, an ink tank 11C for cyan, an ink tank 11M for magenta, an ink tank 11Y for yellow are provided. These ink tanks are collectively referred to as the ink tank 11. Cyan, magenta, and yellow are merely examples of ink colors, and ink colors are not limited thereto.

As illustrated in FIG. 2, the ink tank 11K for black is disposed on the left side of the discharge tray 43 and the paper feeding cassette 6 when viewed from the front of the printing apparatus 1. The ink tank 11C for cyan, the ink tank 11M for magenta, and the ink tank 11Y for yellow are disposed on the right side of the discharge tray 43 and the paper feeding cassette 6 when viewed from the front of the printing apparatus 1. In other words, the discharge tray 43 and the paper feeding cassette 6 are disposed between the ink tank 11K for black and the ink tanks for color. Each ink tank 11 is connected to the printing head 3 by a flexible tube 8 that constitutes a supply passage for supplying an ink to the printing head 3.

The printing apparatus 1 also includes a tank cover 12Bk for black and a tank cover 12Cl for color. The tank cover 12Bk for black covers the upper surface of the ink tank 11K for black. The tank cover 12Cl for color integrally covers the upper surfaces of the ink tank 11C for cyan, the ink tank 11M for magenta, and the ink tank 11Y for yellow. Hereinafter, the tank cover 12Bk for black and the tank cover 12Cl for color are collectively referred to as the tank cover 12.

Ink Injection Operation

FIGS. 3A to 3D are external perspective views of a tank unit 10 including the ink tank 11 and the peripheral configuration thereof. The basic configuration of the tank unit 10 is common among ink colors, and thus, a tank unit for black will be described as an example.

Figure 3A:
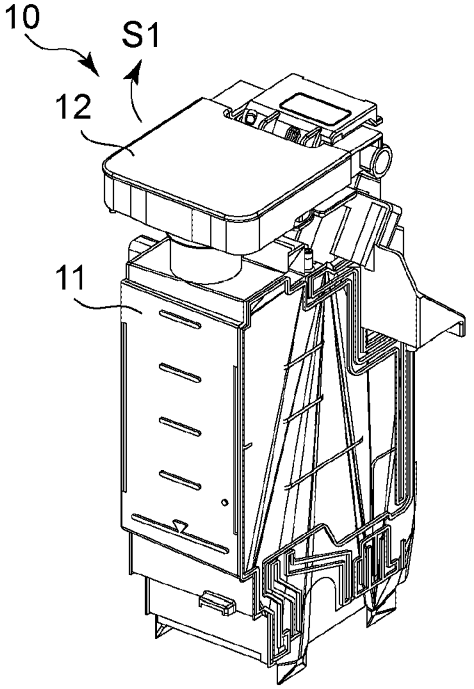
FIGS. 3A, 3B, 3C, and 3D are external perspective views of a tank unit according to the first embodiment.
Figure 3B:
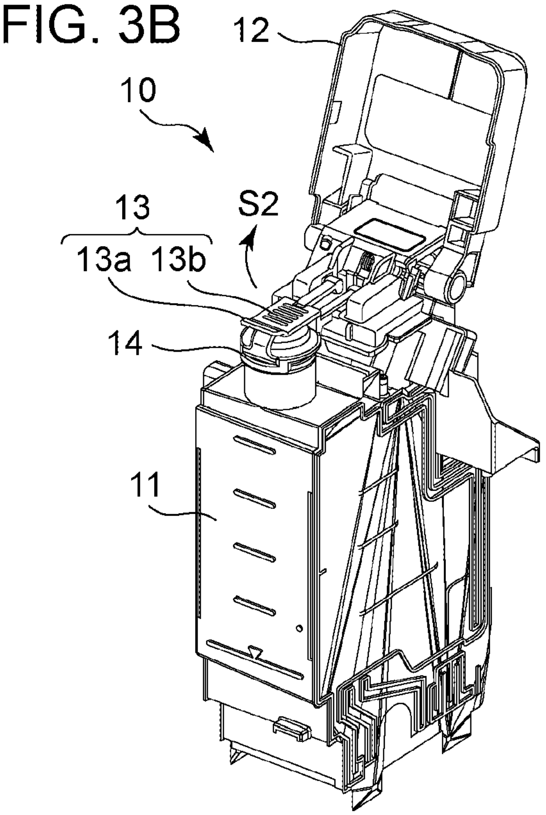
Figure 3C:
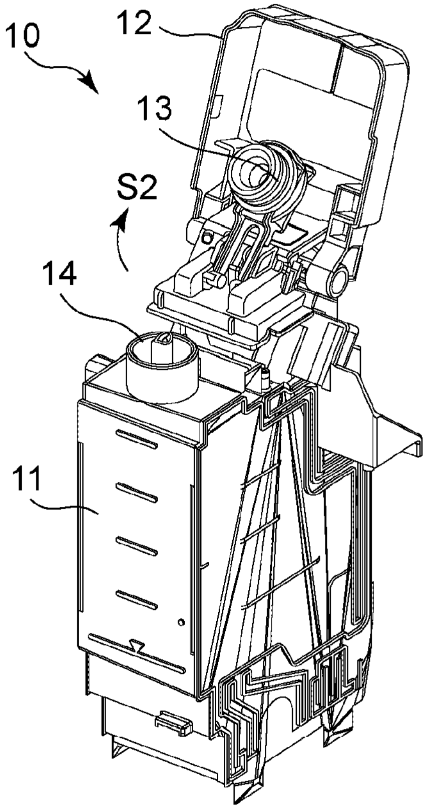

FIG. 3A illustrates a state in which the tank cover 12 is closed. FIG. 3B illustrates a state in which the tank cover 12 is opened. A user is enabled to access a tank cap 13 by opening the tank cover 12 in the S1 direction.

The upper surface of the ink tank 11 includes an injection port 14 for injecting an ink. The injection port 14 is sealable with the tank cap 13. The tank cap 13 is constituted by a cap portion 13*a* for sealing the injection port 14 and a lever portion 13*b* that supports the cap portion 13*a* and that is operable by a user. The lever portion 13*b* is pivotably supported on the body of the printing apparatus 1 so as to be turnable. A user is enabled (refer to FIG. 3C) to inject ink by detaching the cap portion 13*a* from the injection port 14 while turning the lever portion 13*b* in the S2 direction illustrated in FIG. 3B. The lever portion 13*b* may be configured to be pivotably supported on the ink tank 11 or on the tank cover 12 so as to be turnable.

The cap portion 13*a* of the tank cap 13 is constituted by a member having rubber elasticity, and the lever portion 13*b* is constituted by plastic or the like. The lever portion 13*b* of the present embodiment is color-coded with a color corresponding to the color of an ink contained in the ink tank 11. Specifically, the lever portion 13*b* for black is color-coded with black or grey, the lever portion 13*b* for cyan is color-coded with cyan, the lever portion 13*b* for magenta is color-coded with magenta, and the lever portion 13*b* for yellow is color-coded with yellow. Consequently, it is possible to suppress a user from injecting an ink of a wrong color when injecting an ink into the ink tank 11. A form in which not only the lever portion 13*b* but also the cap portion 13*a* is color-coded may be employed.

Figure 3D:
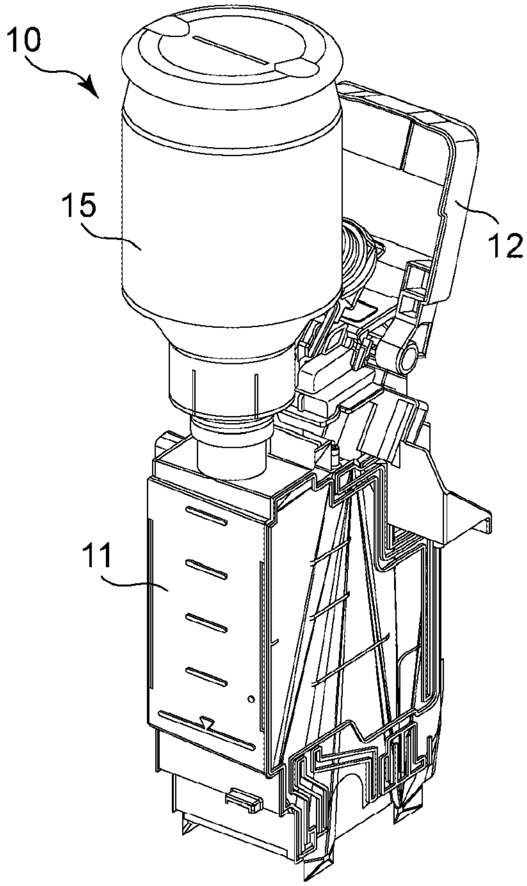

FIG. 3D illustrates a state in which, with the tank cap 13 detached, an ink bottle 15, which is an ink replenishment container, is inserted into the injection port 14 and an ink is injected. In the present embodiment, as a result of gas-liquid exchange being performed between the ink in the ink bottle 15 and the air in the ink tank 11, the ink is injected into the ink tank 11.

Configuration of Ink Tank

Figure 4A:
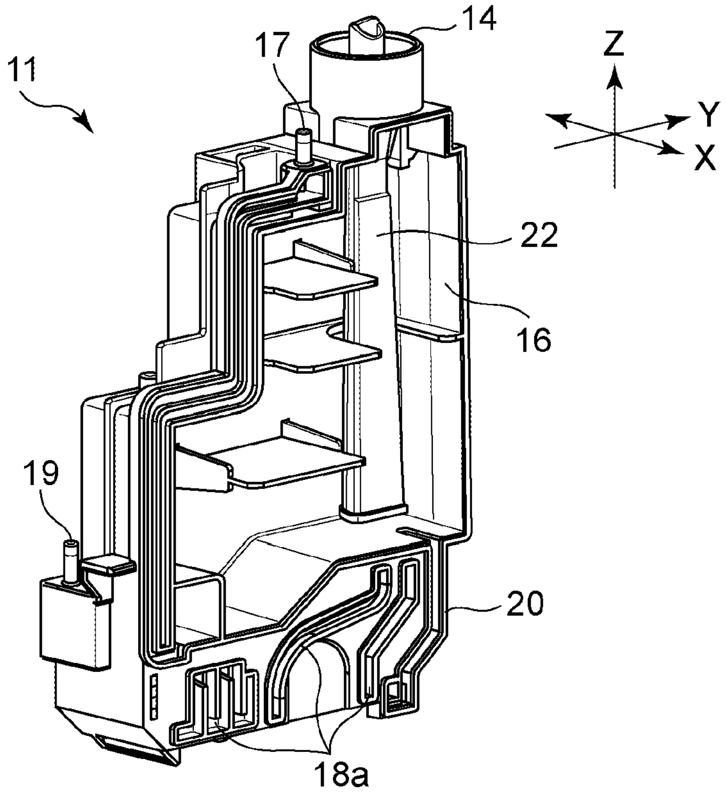
FIGS. 4A and 4B are perspective views of an ink tank according to the first embodiment.

FIG. 4 is a perspective view of the ink tank 11. The ink tank 11 includes an ink containing chamber 16 configured to contain an ink, an ink supply port 17 for supplying the ink in the ink containing chamber 16 to the printing head 3, an air containing chamber 18 configured to contain air, and an air communication port 19 that causes the air containing chamber 18 to be in communication with the atmosphere. The ink containing chamber 16 is disposed in an upper portion of the ink tank 11 so as to open on a first side-surface side. FIG. 4A is a perspective view of the ink tank 11 viewed from the first side-surface side. The ink supply port 17 has one end connected to the ink containing chamber 16 and the other end connected to the tube 8 (refer to FIG. 2). The ink containing chamber 16 is enabled to contain an ink as a result of the opening on the first side-surface side being closed by a flexible film (not illustrated).

Figure 4B:
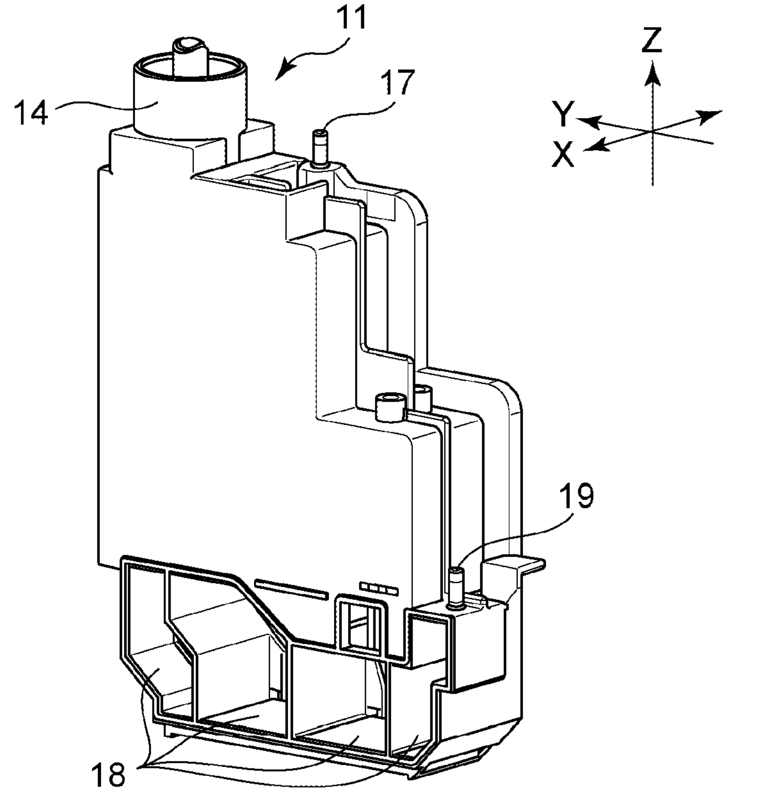

The air containing chamber 18 is disposed below the ink containing chamber 16 so as to open on a second side-surface side opposite the first side-surface side. FIG. 4B is a perspective view of the ink tank 11 viewed from the second side-surface side. The second side-surface side of the air containing chamber 18 is divided into a plurality of rooms. The rooms are in communication with each other via a communication passage 18*a* disposed on the first side-surface side. The second side-surface side where the air containing chamber 18 opens is also closed by a flexible film (not illustrated). The rooms of the air containing chamber 18 are not in communication with each other on the second side-surface side and are in communication with each other via the communication passage 18*a* disposed on the first side-surface side.

The air containing chamber 18 and the ink containing chamber 16 are connected to each other by a connection passage 20 extending downward from the lower surface of the ink containing chamber 16. The lower end portion of the connection passage 20 serves as a gas-liquid exchange portion where gas-liquid exchanged is performed between the ink and the air. The connection passage 20 is disposed on the first side-surface side of the ink tank 11. The gas-liquid exchange portion of the connection passage 20 has a sectional area that enables a meniscus of ink to be maintained. The air communication port 19 in communication with the atmosphere is disposed in an upper portion of the air containing chamber 18. The air communication port 19 and the connection passage 20 are disposed away from each other.

During normal use, an ink is supplied from the ink containing chamber 16 to the printing head 3 in response to ink ejection from the printing head 3, and air of the same volume as that of the supplied ink is supplied from the air containing chamber 18 to the ink containing chamber 16 via the gas-liquid exchange portion. The ink in the ink containing chamber 16, however, drops down into the air containing chamber 18 due to a hydraulic head difference when the meniscus of the gas-liquid exchange portion is broken as a result of the air in the ink containing chamber 16 expanding due to, for example, changes in atmospheric temperature or atmospheric pressure. The air containing chamber 18 thus has a capacity that can contain the ink contained in and filling up the ink containing chamber 16. The air containing chamber 18 thus also functions as a buffer chamber that suppresses an ink from leaking through the air communication port 19 into the apparatus.

Even when the printing apparatus 1 is in an orientation that differs from the orientation during normal use in a state in which an ink is contained in the air containing chamber 18, the ink is suppressed from leaking through the air communication port 19 due to the air communication port 19 and the connection passage 20 disposed away from each other. In addition, an effect of further suppressing leaking of ink is exerted because the air containing chamber 18 divided into the plurality of rooms is present between the connection passage 20 and the air communication port 19 and obstructs the flow of ink. Moreover, the side surface where the divided air containing chamber 18 opens and the side surface where the communication passage 18*a* is disposed differ from each other, which enables a configuration in which an ink does not easily move between adjacent rooms divided from each other. Thus, leaking of ink through the air communication port 19 is avoided.

Configuration of Needle

Figure 5:
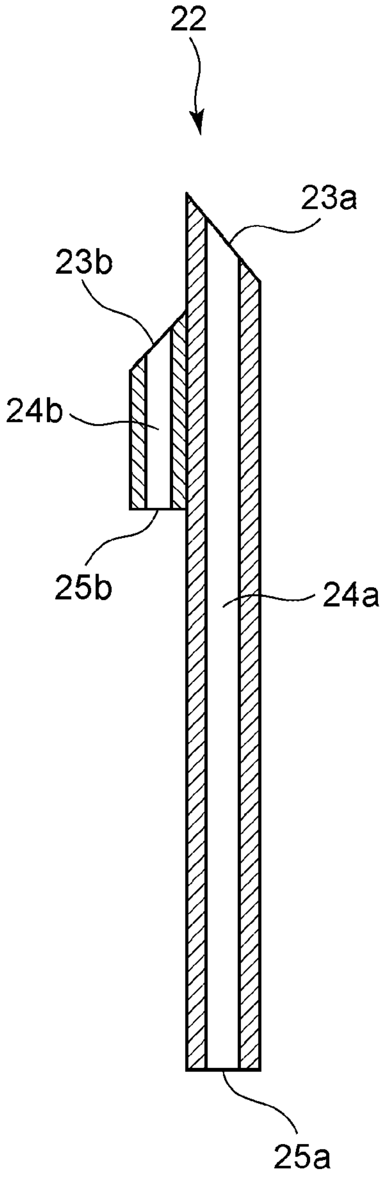
FIG. 5 is a schematic sectional view illustrating the detail of a needle according to the first embodiment.

The ink tank 11 further includes a needle 22 as an injection assistance member that assists ink injection. FIG. 5 is a schematic sectional view illustrating the detail of the needle 22 of the present embodiment. The needle 22 is constituted by a first passage 24*a* and a second passage 24*b* shorter than the first passage 24*a* and causes the inside and the outside of the ink tank 11 to be in communication with each other. In the present embodiment, the sectional area of the first passage 24*a* is larger than the sectional area of the second passage 24*b*.

The first passage 24*a* is defined by a first upper end portion 23*a* that is exposed by extending upward more than the upper end of the injection port 14 and that opens toward the outside of the ink tank 11 and a first lower end portion 25*a* that opens toward the inside of the ink tank 11 (ink containing chamber 16). The second passage 24*b* is defined by a second upper end portion 23*b* that is exposed from the injection port 14 and that opens toward the outside of the ink tank 11 and a second lower end portion 25*b* that opens toward the inside of the ink tank 11 (ink containing chamber 16).

The first upper end portion 23*a* of the first passage 24*a* is formed to be high in the gravitational direction so as to project upward more than the second upper end portion 23*b* of the second passage 24*b*. The first upper end portion 23*a* and the second upper end portion 23*b* each open obliquely in the direction in which the passages extend and each have an inclined surface that becomes higher toward the center portion at which the first upper end portion 23*a* and the second upper end portion 23*b* are in contact with each other. The first lower end portion 25*a* is formed to be low in the gravitational direction so as to project downward more than the second lower end portion 25*b*.

Figure 6A:
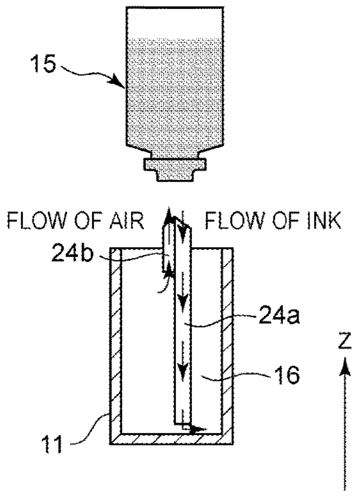
FIGS. 6A, 6B, and 6C are schematic views illustrating ink-injection operation.
Figure 6B:
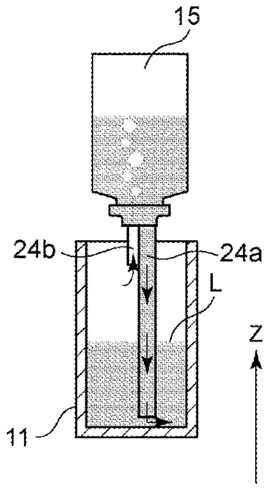
Figure 6C:
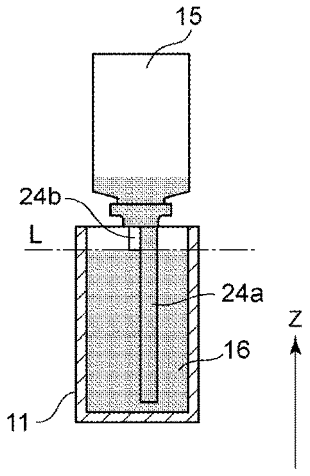

FIGS. 6A, 6B, and 6C are schematic views illustrating ink-injection operation utilizing gas-liquid exchange according to the present embodiment. FIG. 6A illustrates a state in which the ink tank 11 is empty. In the ink injection operation, one of the first passage 24*a* and the second passage 24*b* that form the needle 22 functions as an ink passage and the other functions as an air passage. The opening of the ink bottle 15 is closed by a sealing member (not illustrated) and configured such that the ink does not drip even when the opening is directed downward as illustrated in FIG. 6A.

When the ink bottle 15 is inserted into the ink tank 11 as illustrated in FIG. 6B, the needle 22 opens the sealing member of the ink bottle 15. Consequently, the ink in the ink bottle 15 flows into the ink tank 11 through the first passage 24*a*, and the air in the ink tank 11 flows into the ink bottle 15 through the second passage 24*b*. In other words, the first passage 24*a* functions as an ink passage, and the second passage 24*b* functions as an air passage. The ink is thus injected into the ink tank 11 by utilizing gas-liquid exchange in which the ink and the air are exchanged between the ink tank 11 and the ink bottle 15.

When an ink liquid surface L reaches the second lower end portion 25*b* of the second passage 24*b* that functions as the air passage, as illustrated in FIG. 6C, the gas-liquid exchange stops because the air is disabled to flow out from the second lower end portion 25*b* into the ink bottle 15. In other words, ink injection from the ink bottle 15 into the ink tank 11 stops on the basis of the position of the second lower end portion 25*b* at the time when the ink bottle 15 is inserted into the ink tank 11. The above is the principle of the ink injection operation utilizing gas-liquid exchange.

Figures 7A, 7B, 7C:
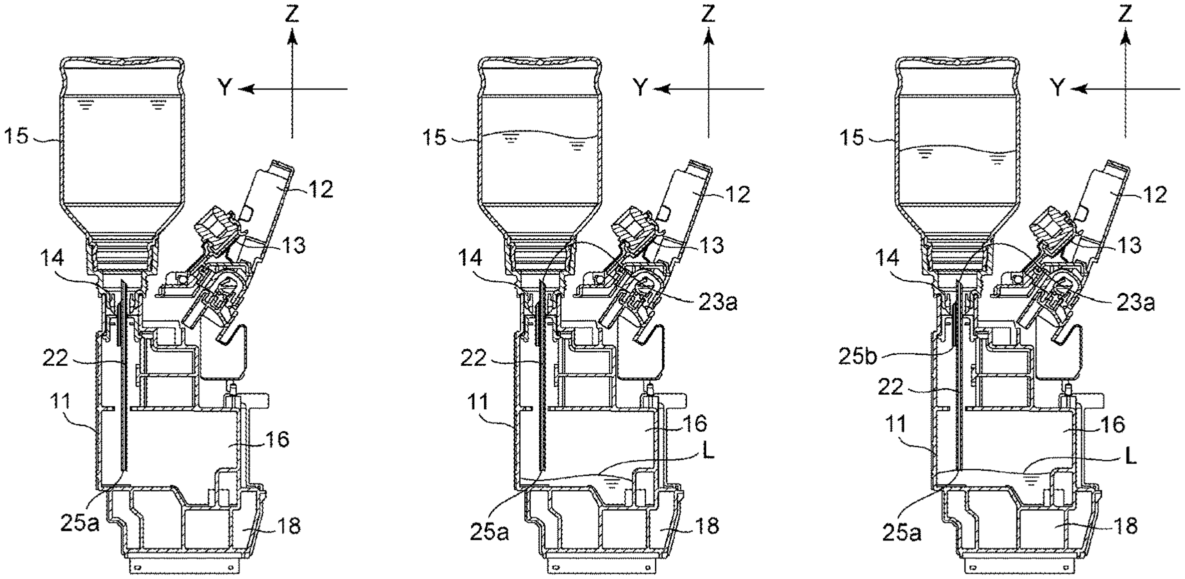
FIGS. 7A, 7B, and 7C are schematic sectional views illustrating features of the needle according to the first embodiment.

Next, features of the needle 22 of the present embodiment will be described in detail with reference to FIGS. 7A, 7B, and 7C. FIGS. 7A, 7B, and 7C are schematic sectional views when ink injection operation is started by a user. FIG. 7A illustrates a state immediately after the ink bottle 15 is inserted into the injection port 14. In the insertion of the needle 22 into the ink bottle 15, the first passage 24*a* first comes into contact with the ink contained in the ink bottle 15 because the first upper end portion 23*a* of the first passage 24*a* projects upward, compared with the second upper end portion 23*b* of the second passage 24*b*. Therefore, the needle 22 of the present embodiment has a configuration in which the first passage 24*a* is easily determined as an ink passage.

FIG. 7B illustrates a state after ink injection from the ink bottle 15 into the ink tank 11 (ink containing chamber 16) is started. In the ink injection utilizing gas-liquid exchange, the ink flows from the ink bottle 15 into the ink tank 11 by an amount corresponding to the amount of air that has flowed from the ink tank 11 into the ink bottle 15. Therefore, a configuration in which the air easily moves away from the needle 22 by becoming bubbles causes inflow of ink to be performed smoothly.

As described above, the first upper end portion 23*a* and the second upper end portion 23*b* have the inclined surfaces, and the inclined surfaces cause the air to easily move away from the needle 22, which accelerates inflow of the air. Detail will be described with reference to FIGS. 8A, 8B, 8C, and 8D and FIGS. 9A, 9B, 9C, and 9D.

FIGS. 8A, 8B, 8C, and 8D illustrate a comparative example in which the first upper end portion 23*a* and the second upper end portion 23*b* have no inclined surfaces. FIGS. 9A, 9B, 9C, and 9D are schematic views of the first upper end portion 23*a* and the second upper end portion 23*b* having inclined surfaces as with the present embodiment. When air flows from the second upper end portion 23*b* into the ink in the ink bottle 15, bubbles of the air are required to be formed and move away from the second upper end portion 23*b*, as illustrated in FIG. 8A to FIG. 8D and FIG. 9A to FIG. 9D.

Figure 8A:
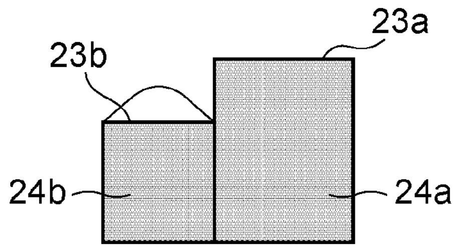
FIGS. 8A, 8B, 8C, and 8D illustrate a comparative example including no inclined surface on an upper end portion of the needle.
Figure 8B:
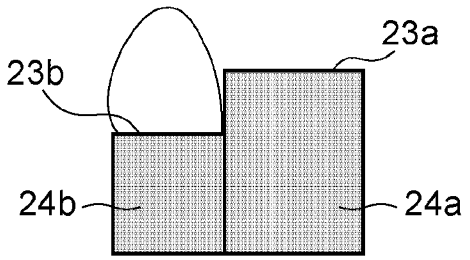
Figure 8C:
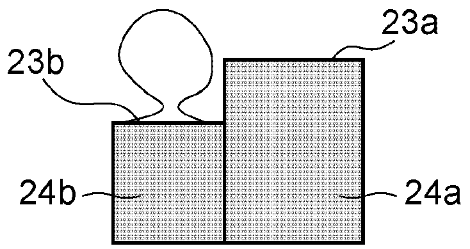
Figure 8D:
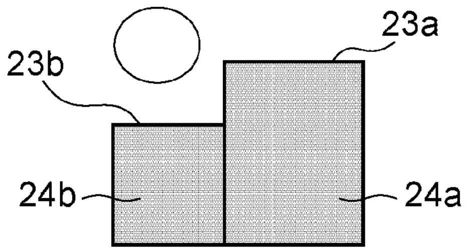

At this time, when no inclined surfaces are formed, as with the comparative example illustrated in FIGS. 8A, 8B, 8C, and 8D, the bubbles are required to move away from the entirety of the opening surface of the second upper end portion 23*b* when transiting from the state in FIG. 8B to the state in FIG. 8C, which takes time. In other words, the bubbles are in surface contact with the second upper end portion 23*b*, and thus, the bubbles do not easily move away from the second upper end portion 23*b* because of the large contact area.

Figure 9A:
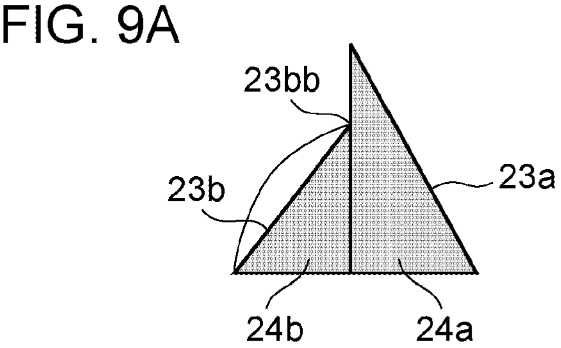
FIGS. 9A, 9B, 9C, and 9D are schematic views illustrating the upper end portion of the needle according to the first embodiment.
Figure 9B:
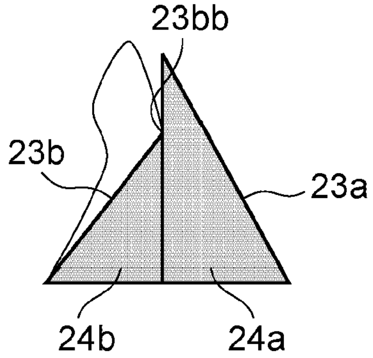
Figure 9C:
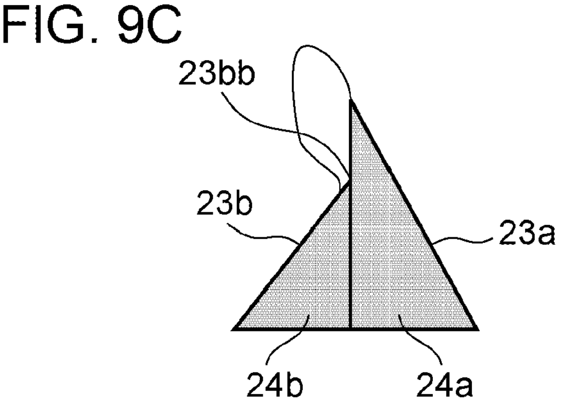
Figure 9D:
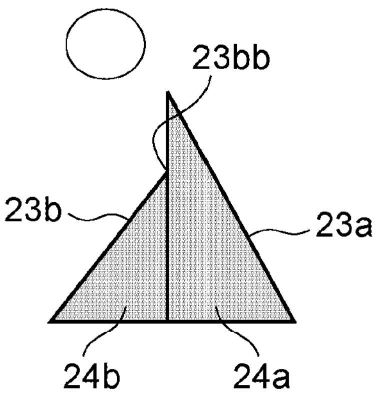

In contrast, when inclined surfaces are formed as with the present embodiment, the bubbles move away from a top portion 23*bb* of the second upper end portion 23*b* when transiting from the state in FIG. 9B to the state in FIG. 9C, and thus, bubbles are easily formed. In other words, the bubbles are in liner contact with the top portion 23*bb*, and thus, the bubbles easily move away from the top portion 23*bb* because the contact area is small compared with the case in FIGS. 8A, 8B, 8C, and 8D. Therefore, inflow of the air from the ink tank 11 into the ink bottle 15 is smoothly performed, and thus, the speed of inflow of the ink from the ink bottle 15 into the ink tank 11 is also increased. Moreover, the inclined surfaces are formed to become higher toward the portion at which the first upper end portion 23*a* and the second upper end portion 23*b* are in contact with each other. Consequently, the bubbles move upward while being in contact with the side surface of the first upper end portion 23*a* and thus more easily move away from the top portion 23*bb* (refer to FIG. 9C).

With reference to FIG. 7A, a configuration in which the first passage 24*a* easily functions as an ink passage has been described; however, there is actually a case in which the ink does not flow through the first passage 24*a*. In this case, the bubbles flow in from the first upper end portion 23*a*. Therefore, in the present embodiment, the first upper end portion 23*a* also has the inclined surface.

FIG. 7C illustrates a state in which the ink liquid surface L in the ink tank 11 has reached the first lower end portion 25*a* of the first passage 24*a*. A distance between the first lower end portion 25*a* and the bottom surface of the ink containing chamber 16 is smaller than a distance between the second lower end portion 25*b* and the bottom surface of the ink containing chamber 16. When the ink liquid surface L reaches the first lower end portion 25*a*, the first lower end portion 25*a* is closed by the ink, which disables inflow of air from the first lower end portion 25*a*. Consequently, even if air flows in the first passage 24*a* and ink flows in the second passage 24*b*, the first passage 24*a* is determined to function as an ink passage and the second passage 24*b* is determined to function as an air passage. As a result of the distance between the first lower end portion 25*a* of the first passage 24*a* functioning as an ink passage and the bottom surface of the ink containing chamber 16 thus being set to be as small as possible, which one of the first passage 24*a* and the second passage 24*b* the ink flows through is quickly determined. Consequently, it is possible to reduce a time required for ink injection.

If the first lower end portion 25*a* has the same height as that of the second lower end portion 25*b*, the ink liquid surface L is slow to reach the first lower end portion 25*a*. Thus, it takes time to determine the first passage 24*a* as an ink passage. When pressure balance is generated before the determination of the passage due to the air and the ink mixed and present in the first passage 24*a* and the second passage 24*b*, inflow of the ink may stop before the ink is injected and fills up the ink containing chamber 16. In contrast, by making the first lower end portion 25*a* extend to the vicinity of the bottom surface of the ink containing chamber 16, as with the present embodiment to thereby quickly determine the passage, the ink can be injected to fill up the ink containing chamber 16.

Here, the flow resistance of the ink is larger than the flow resistance of the air, and the sectional area of the first passage 24*a* is thus formed to be larger than the sectional area of the second passage 24*b*. Consequently, it is possible to increase the inflow amount of the ink per unit time. For example, the sectional area of the first passage 24*a* is 9.6 $mm^2$, and the sectional area of the second passage 24*b* is 5.4 $mm^2$.

As above, being constituted by the two passages including the upper end portions having different heights, the needle 22 of the present embodiment facilitates determination of the passage for the ink that flows out from the ink bottle 15. Moreover, due to the upper end portions having the inclined surfaces, inflow of the air into the ink bottle 15 is smoothly performed. In addition, the small distance between the lower end portion of the first passage 24*a* and the bottom surface of the ink containing chamber 16 facilitates determination of the ink passage. Having the sectional area larger than the sectional area of the second passage 24*b* determined as the air passage, the first passage 24*a* determined as the ink passage increases the ink injection amount per unit time. These configurations reduce the time required for ink injection, which enables an improvement of usability of a user.

In the present embodiment, a form in which the ink tank 11 is fixed to the printing apparatus 1 and in which an ink is supplied through the tube 8 is presented; however, the present invention is not limited thereto and is also applicable to a form commonly known as on-carriage, in which the ink tank is loaded together with the printing head 3 on the carriage 31. In other words, a form in which the ink tank loaded on the carriage 31 includes the injection port and the needle and in which the ink is injected from the ink bottle by a user may be employed.

Second Embodiment

Hereinafter, a second embodiment of the present invention will be described with reference to the drawings. The basic configuration of the second embodiment is the same as that in the first embodiment, and thus, only configurations having features will be described below.

Figure 10A:
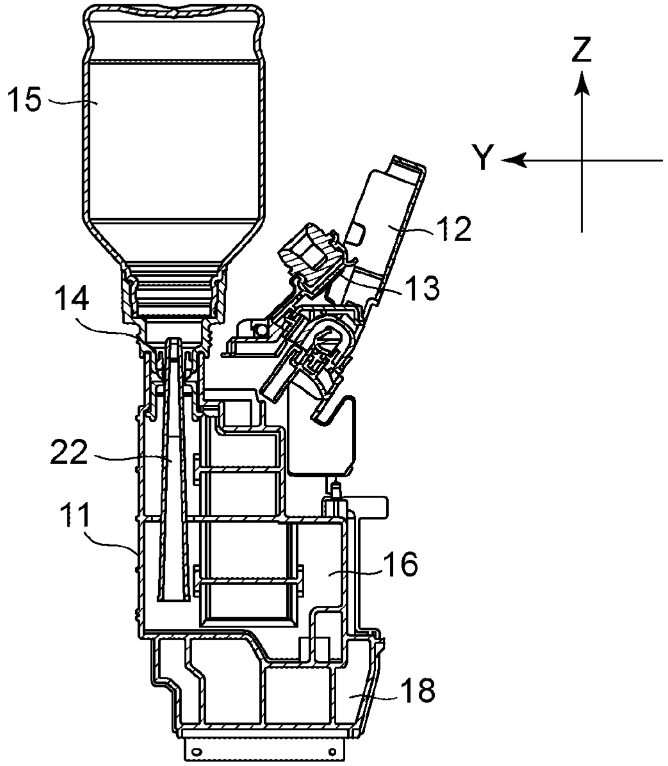
FIGS. 10A and 10B are sectional views illustrating the detail of a needle according to a second embodiment.
Figure 10B:
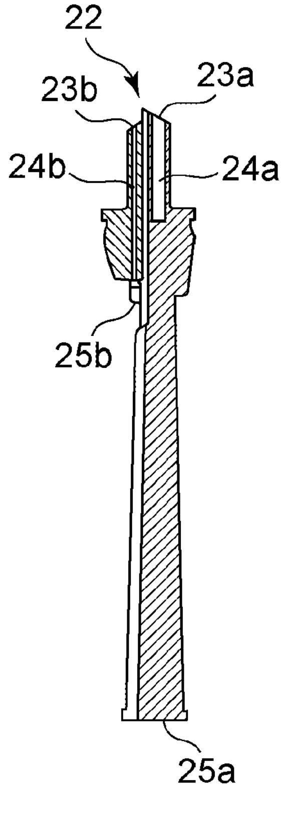

FIGS. 10A and 10B are sectional views of the needle 22 in the second embodiment. FIG. 10A illustrates a state in which an ink is injected from the ink bottle 15 by using the needle 22 of the second embodiment. FIG. 10B illustrates a detailed configuration of the needle 22 of the second embodiment. Differently from the first embodiment, the needle 22 has a tapered shaped to make the sectional area of the first passage 24*a* be larger toward the first lower end portion 25*a*. The inside of the first passage 24*a* is constituted by a smooth surface without irregularity. Such a smooth passage shape having the sectional area that increases from the first upper end portion 23*a* toward the first lower end portion 25*a* makes it possible to increase the flow velocity of ink more than the first embodiment.

Figure 11A:
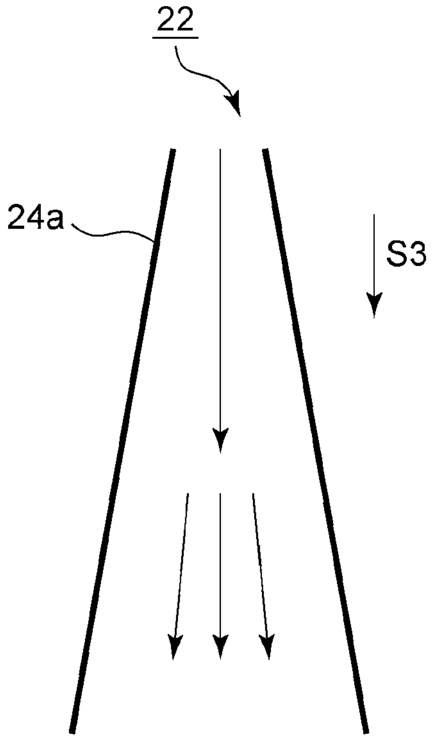
FIGS. 11A and 11B are schematic views illustrating a tapered shaped of the needle according to the second embodiment.
Figure 11B:
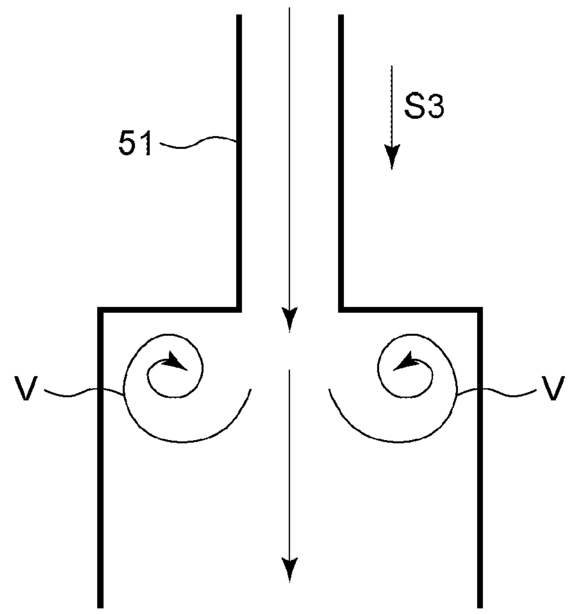

With reference to FIGS. 11A and 11B, an effect of the tapered shape will be described. FIG. 11A is a schematic view illustrating a configuration of the first passage 24*a* of the second embodiment. FIG. 11B is a schematic view illustrating a comparative example in which the sectional area of a passage suddenly increases. In FIG. 11A and FIG. 11B, the ink flows in the S3 direction.

When the sectional area suddenly increases as illustrated in FIG. 11B, a vortex V is generated in a portion where the sectional area is increased, and a pressure loss is thereby generated. Consequently, the injection speed of the ink decreases. In contrast, when the sectional area slowly increases as illustrated in FIG. 11A, no pressure loss is generated, and thus, the flow velocity of the ink does not decrease. Configuring the first passage 24*a* to have the tapered shape the sectional area of which slowly increases makes it possible to increase the flow velocity of ink and reduce the ink injection time.

Figure 12:
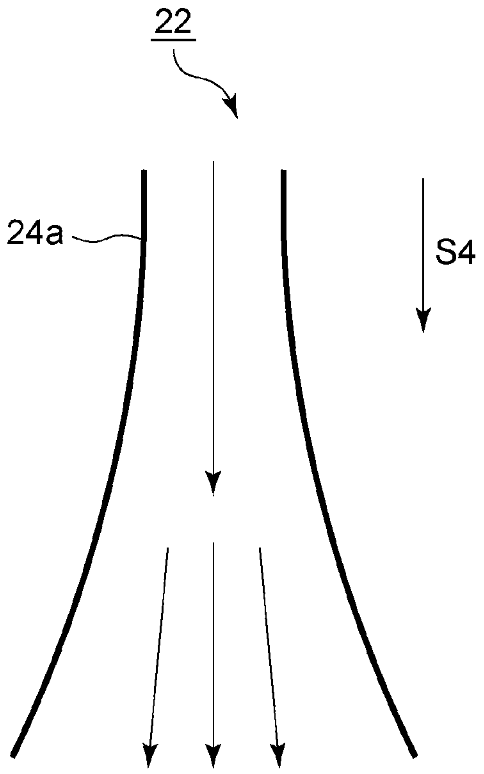
FIG. 12 is a sectional view illustrating a modification of the needle according to the second embodiment.

FIG. 12 is a schematic view of the needle 22 in a modification of the second embodiment. The ink flows in the first passage 24*a* in the S4 direction. Even when the first passage 24*a* is configured to have a trumpet shape the sectional area of which increases gradually as illustrated in FIG. 12, an effect similar to that with the tapered shape can be obtained. Configuring the sectional area of the passage in which the ink flows to increase smoothly toward the first lower end portion 25*a* makes it possible to reduce the time required for ink injection.

In other words, according to the present invention, it is possible to provide an inkjet printing apparatus in which the time required for ink injection into the ink tank is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An inkjet printing apparatus comprising:

an ink tank configured to contain an ink to be supplied to a printing head that ejects the ink, the ink being injected from an ink bottle;

a first passage defined by a first end portion and a second end portion, the first end portion, to which the ink bottle approaches for injection of the ink from the ink bottle into the ink tank, the second end portion opening on an inside of the ink tank, and a second passage defined by a third end portion and a fourth end portion, the third end portion, to which the ink bottle approaches for injection of the ink from the ink bottle into the ink tank, the fourth end portion opening on the inside of the ink tank, and a tank cap configured to seal an injection port including the first end portion and the third end portion, wherein the first end portion is projecting upward more than the third end portion and an upper end of the injection port, and wherein the tank cap is supported by a lever portion pivotably supported on the ink tank or on a body of the apparatus so as to be turnable.

2. The inkjet printing apparatus according to claim 1, wherein the ink tank contains an ink of one color.

3. The inkjet printing apparatus according to claim 1, further comprising a tank cover configured to cover an upper surface of the ink tank, wherein the tank cover is movable between a first position at which the tank cover covers the upper surface of the ink tank and a second position the tank cover does not cover the upper surface of the ink tank, and wherein in a case where the tank cover is located at the first position, a user is not enabled to access the tank cap.

4. The inkjet printing apparatus according to claim 3, further comprising a cover configured to cover an upper surface of the inkjet printing apparatus, wherein the cover is movable between a first position at which the cover covers the upper surface of the inkjet printing apparatus and a second position the cover does not cover the upper surface of the inkjet printing apparatus, and wherein in a case where the cover is located at the first position, a user is not enabled to access the tank cover.

5. The inkjet printing apparatus according to claim 1, further comprising a plurality of ink tanks, wherein each one of the ink tanks contains an ink of one color.

6. The inkjet printing apparatus according to claim 1, wherein the third end portion is projecting upward more than the upper end of the injection port.

7. The inkjet printing apparatus according to claim 1, wherein the injection port includes a circular shape portion configured to continuously surround the first passage and the second passage.

8. The inkjet printing apparatus according to claim 1, wherein a needle comprises the first passage and the second passage.

9. The inkjet printing apparatus according to claim 8, the needle includes a partition wall that divides an inside of the needle into the first passage and the second passage, and a direction in which the partition wall divides the passages intersects a direction in which a rotational axis of the lever portion extends.

10. The inkjet printing apparatus according to claim 8, wherein the tank cap comprises a cap portion for sealing the injection port.

11. The inkjet printing apparatus according to claim 10, wherein the cap portion comprises a member having rubber elasticity.

12. The inkjet printing apparatus according to claim 10, wherein, when the tank cap seals the injection port, the cap portion is disposed between the injection port and the needle.

* * * * *